Oct. 18, 1938.
L. R. TOWER
Re. 20,891
CONTROL FLAP AND BALANCE
Original Filed Aug. 18, 1931
3 Sheets-Sheet 1
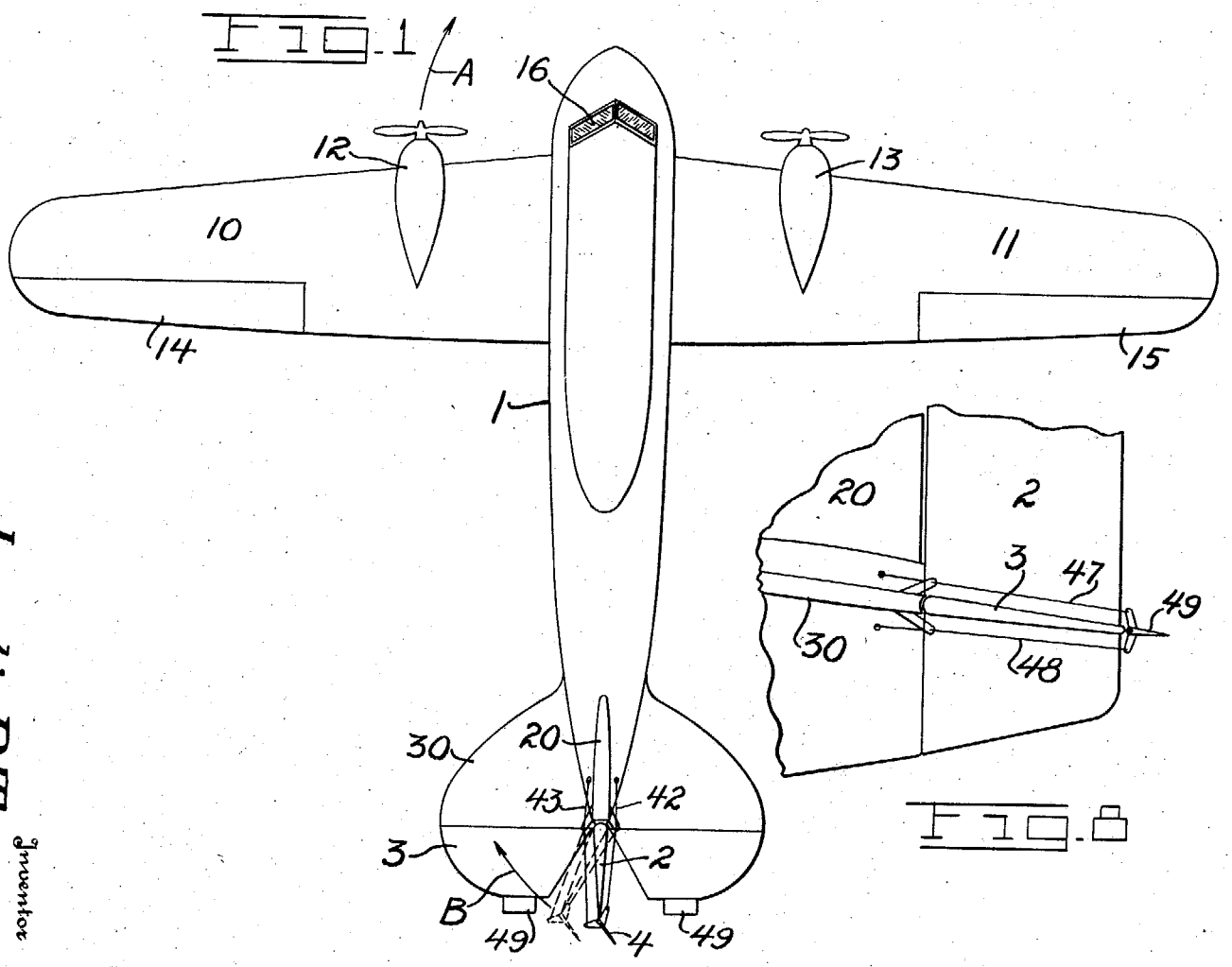
Inventor
Leslie R. Tower
By Charles L. Reynolds
Attorney Oct. 18, 1938. L. R. TOWER Re. 20,891

CONTROL FLAP AND BALANCE

Original Filed Aug. 18, 1931 3 Sheets-Sheet 2

Inventor

Leslie R. Tower

By Charles L. Reynolds

Attorney

Oct. 18, 1938. L. R. TOWER Re. 20,891

CONTROL FLAP AND BALANCE

Original Filed Aug. 18, 1931 3 Sheets-Sheet 3

Inventor

Leslie R. Tower

By Charles L. Reynolds

Attorney

Reissued Oct. 18, 1938

Re. 20,891

UNITED STATES PATENT OFFICE 20,891

CONTROL FLAP AND BALANCE

Leslie R. Tower, Seattle, Wash., assignor to Boeing Aircraft Company, Seattle, Wash., a corporation of Washington Original No. 1,914,000, dated June 13, 1933, Serial No. 557,830, August 18, 1931. Application for reissue April 16, 1934, Serial No. 720,886

5 Claims. (Cl. 244—82)

My invention relates to aircraft and particularly to the control surfaces thereof. By this term I intend to include the rudder, the elevator or flipper, and the ailerons, which at present comprise all the surfaces which control direction, laterally and vertically, and stability of an aircraft while in flight, as distinguished from sustaining surfaces.

It has been proposed heretofore to support an auxiliary control surface or flap, known as a Flettner balance, upon or in conjunction with a control surface (for instance, the rudder), as a means of balancing this control surface and assisting the pilot to move it more easily. However, as heretofore employed, the pilot has had no control over such a flap, and it has always been controlled, so far as I am aware, by lines arranged to maintain the flap always in position parallel to its initial position, which initial position is in the plane of the control surface when in straightaway flight. In other words, it remains always parallel to the line of flight. Located at the trailing edge, such a flap, though small, exerts a marked influence on the operation of the control surface upon which it is mounted, and renders it considerably easier to move a large control surface such as is employed upon heavy transport planes and the like. Such a balance, however, has no effect unless and until the rudder upon which it is mounted is first deflected. It cannot, per se, initiate movement, nor will it maintain the rudder deflected.

Airplanes equipped with two or more motors ordinarily have the motors balanced one against the other at opposite sides of the longitudinal axis of the craft. In the event one of these motors fails to function, the remaining motor tends to throw this side of the airplane ahead, and the pilot, at such a critical moment, is placed under the necessity of employing extreme physical effort to control the plane, since it is extremely difficult to shift the large control surfaces to counterbalance the single motor. Thus, while the plane is controllable, considerable effort is required to control it.

As a special case, illustrative of the general object hereinafter defined, it is an object of my invention to devise a means associated with the normal rudder for counteracting the unbalanced pull of an outboard motor, in a case of this sort, so that the plane may be brought under normal control and maneuvered with the customary ease for continued flight, if that be desired to find a proper landing place, and whereby it may be brought to earth under full control, without undue physical exertion on the part of the pilot.

It is also an object to combine with such auxiliary control means a balance such as that referred to above, whereby the regular control surfaces will be assisted, under normal conditions of operation, in moving from one position to another without undue physical exertion on the part of the pilot, yet available at all times as an auxiliary control.

It is also an object, in another specific form of my invention, to provide a device of the character indicated, which will function solely to counteract an unbalanced force, such as the pull of a single outboard motor, without any action normally in assisting the control surfaces to move from one position to the other.

It is the general object of my invention, broadly stated, to provide a device to be associated with any of the control surfaces of an aircraft, whereby the pilot can, at will, counteract any unbalanced force tending to deflect the craft from the selected line of flight, in such a way as to leave the aircraft amenable to the controls in the usual way; in addition, it is an object to provide such counterbalancing means which may be further and normally employed to assist in the routine control of the craft.

It is also an object to provide an auxiliary control of the general character indicated which, because of its location and manner of association with the usual tail surfaces, will permit a stronger construction of the latter, with lessened weight and fewer complications of parts.

It is also an object to maintain control over the movements of such a flap through a member definitely located with respect to the hinge axis of the control surface, and by the character of this connection determining the movement of the flap upon movement of the control surface, whether relative to the said control surface or relative to the fixed surface whereon the latter is hinged.

My invention comprises broadly the provision of auxiliary control means with or without the normal balancing effect, and with whatever control surfaces it may be associated, as is shown in the accompanying drawings and more particularly defined by the claims which terminate the same.

In the accompanying drawings I have shown my invention diagrammatically in forms which illustrate the principles thereof, and as now preferred by me.

Figure 1 is a plan view of a two-motored plane illustrating the effect thereon of one motor cutting out, and the counterbalancing effect of the auxiliary control or flap.

Figure 8 is a side elevation of the tail surfaces of a plane, showing my invention adapted for use in connection with the elevator.

Figure 3:
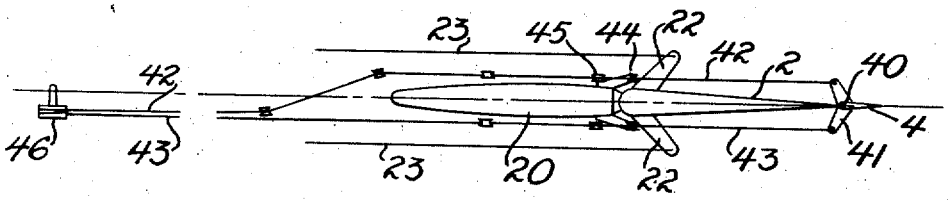
Figures 3 and 4 are diagrammatic views in plan, showing parts in position for normal straight-ahead flight and for a turning movement, respectively, and all illustrating one form of my invention as applied to a rudder.
Figure 4:
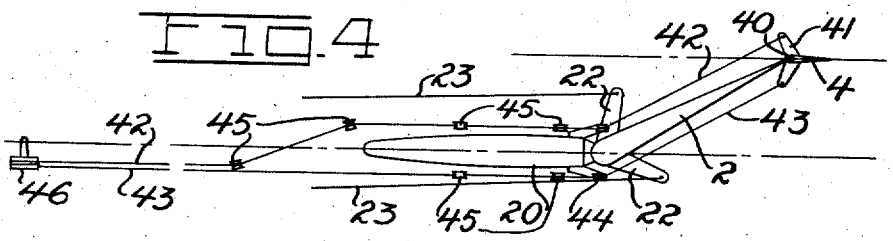
Figure 2:
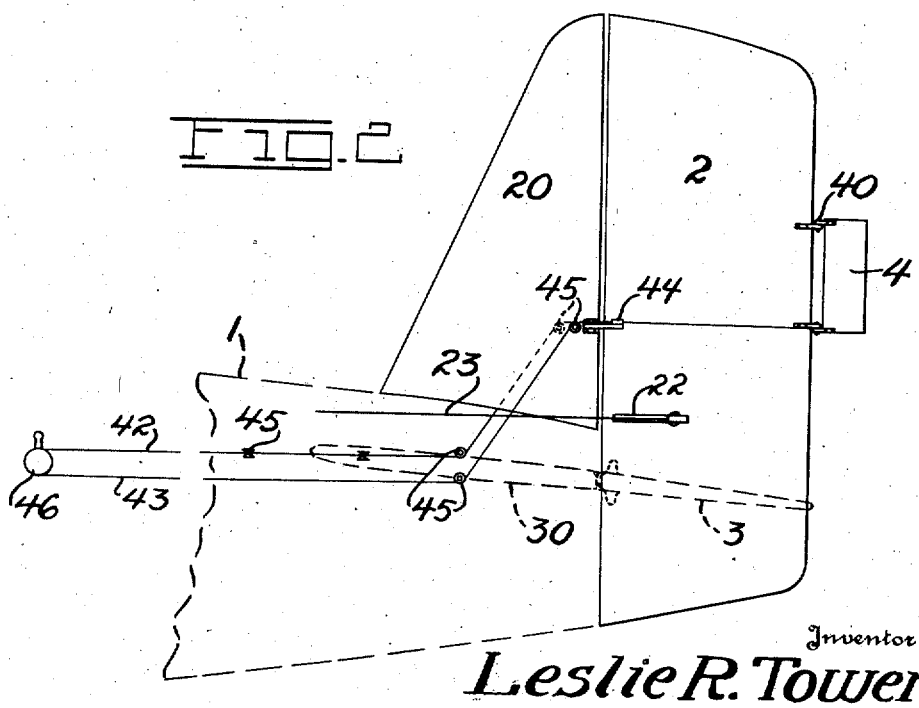
Figure 2 is a side elevation of the rudder and vertical fin.

In one form, illustrated in Figures 1 to 4 inclusive, and 8, my invention is in effect a Flettner balance, but differing therefrom in that there are means operable from the pilot's seat by which to change the angle of the balance relative to the control surface, such as the rudder, elevator or ailerons, while in normal straight-ahead flight, so that the balance flap will cause the control surface upon which it is mounted to be deflected from its normal position in such an amount as to counteract any tendency for the craft to deviate from a straight line of flight, due to such causes, for instance, as the cutting out of one of an outboard pair of motors, which are normally balanced one against the other. It need not necessarily take such form, as may be observed in Figures 5, 6 and 7. In this latter form it does not function as a Flettner balance, but is purely and simply a trimming flap, and except when it is used to counterbalance an uneven application of power, it lies at all times in the plane of the control surface upon which it is mounted, and swings therewith.

The airplane of Figure 1 is purely a diagrammatic showing for purposes of illustrating the principles governing the application of my invention to an airplane. The fuselage 1 is sustained in flight by the wings 10 and 11, on which are mounted the motors 12 and 13, respectively, and lateral stability is achieved by such means as the ailerons 14 and 15 respectively. The pilot, from his compartment at 16, controls the flight of the plane, and in so doing causes movement of the elevator or flipper 3, hingedly mounted along a horizontal axis upon the horizontal stabilizer 30, and the rudder 2 hingedly mounted upon a vertical axis 31 upon the vertical fin 40. Thus in each case there is a fixed surface and a cooperating control surface hingedly mounted thereon (the wing and aileron forming one such pair), and the flap is mounted on the hingedly mounted control surface. The normal controls for the movable control surfaces, for instance the rudder 2, are still employed, these being diagrammatically represented by the masts 22 and the cables or wires 23 running forward to the pilot's compartment (see Figures 3, 4, 6 and 7). The application of my invention in nowise interferes with these normal controls. The controls, however, are omitted in Figure 1 and Figure 8 for clearness of illustration of my invention.

Assuming a dual-motored plane to be in flight (or any aircraft having pairs of motors balanced one against the other at opposite sides of the line of flight), if one of the motors stops or fails to function properly, an unbalanced force is produced. Referring to Figure 1, should the right-hand motor 13 cut out, the plane will have a tendency, under the influence of the left-hand motor 12, to move about the plane's center of gravity to the right, as indicated by the arrow A. A flap 4, properly associated with the rudder 2 (for instance, hinged upon the trailing edge of the rudder), and operated by a windlass 46 suitably connected to the flap and under the control of the pilot, may be immediately swung on its hinge axis, to stand at an angle to the plane of the rudder—in this instance, to the right. This produces a strong tendency to throw the rudder to the left (see arrow B), until the side thrust of the flap is counteracted by the side thrust of the rudder. The rudder, consequently, comes to rest, deflected sufficiently to counterbalance the side thrust of the operative motor 12. The plane may continue its flight, in control, until a landing may be safely effected. Of course, it is not desirable to continue in this fashion, due to the limitation on movement of the rudder to the left, but the plane is in control, and may continue its flight until a suitable landing place is found, and any landing may be effected with safety.

Such a flap may have a further normal function akin to a Flettner balance, moving automatically to remain parallel to its initial position, whether that be parallel to the line of flight or deflected therefrom, whenever there is initiated movement of the control surface, upon which it is mounted.

The flap 4, to accomplish these two ends, is pivoted upon an axis 40 upon the trailing edge and parallel to the hinge axis of a control surface (such as the rudder 2), and because of this location, the flap, though of small area, exerts considerable influence upon the control surface, and serves to balance it and cause it to swing, once deflection of the control surface has been initiated, for the reason that means are provided to maintain the flap 4 in a plane always parallel to its initial position. It maintains substantially unchanged its angular relationship to the fixed fin 20. This may be accomplished by any suitable means, diagrammatically illustrated by the masts 41 upon the flap connected to similar elements 44 upon the trailing edge of the vertical fin 40, and connected thereto by cables or wires 42 and 43, whereby a parallelogram is formed, and the flap 4 is always kept in a plane parallel to its initial plane. Normally this is parallel to the line of flight of the aircraft, but if the flap has been deflected theretofore, it will remain substantially parallel to the adjusted position. The forward ends of the cables or wires 42 and 43 in such instances are fixed in position at 44. However, as will now be understood, these cables, in accordance with my invention, may or may not be secured at this position, at the will of and at all times under the control of the pilot. To accomplish this, these cables may extend forward, the members 44 being in this instance formed as fair-leaders, and the cables are led over guide pulleys and through fair-leaders, as generally indicated at 45, to the drum or windlass 46, located in position to be controlled by the pilot.

Now the flap 4 can be fixed, under the influence of the windlass 46, in a position where, in straight-ahead flight, it lies in the same plane as the rudder 2 upon which it is mounted, and in this position it will act as the usual Flettner balance, assisting the pilot to swing the rudder during normal flight, and relieving him of the physical exertion necessary to throw the rudder to one side or the other. However, should one of the motors cut out, for instance, the motor 13

(see Figure 1), the plane will have a tendency, under the influence of the motor 12, to move about the center of gravity to the right, as indicated by the arrow A. Immediately the pilot makes adjustment of the windlass 46, throwing the flap 4 to the right, as illustrated in Figure 1, and the flap causes the rudder 2 to swing to the dotted line position of Figure 1, as indicated by the arrow B, and this immediately counteracts the tendency to swing in the direction of the arrow A, throws the rudder 2 to the left, and causes the plane to maintain a straight-ahead flight. Of course, it is not desirable to continue in this fashion, but nevertheless the plane is in normal control and may be flown without physical strain on the pilot until a suitable landing place is found, or if a landing place is available, it may be brought down under full control without the danger of a crash.

The same principles may be applied to other control surfaces than the rudder, and are so illustrated in Figures 1 and 8, wherein the auxiliary flaps 49 are shown applied to the elevator or flipper 3, the position of this flap being controlled by cables 47 and 48 in exactly the same manner as that described for the flap 4.

One advantage of this arrangement with such a flap applied to the elevator, is that the horizontal stabilizer 30 need not be made adjustable. Such stabilizers are frequently adjustable in angle relative to the line of flight to cause the plane to nose up or down and thus to counteract varying dispositions of the load at different times. This adds weight to the tail structure and necessitates extremely strong mounting means for the adjustable stabilizer, and the employment of stout means to control the angle of the stabilizer 30. With such a control flap 49 applied to the elevator, it becomes unnecessary to adjust the stabilizer 30, and this may be made stronger because it can be permanently secured, as for instance by welding, to the tail post and the tail portion of the fuselage, and the controls therefore can be omitted. Thus weight is saved directly, and construction is simplified and made stronger, again saving weight indirectly.

Figure 6:
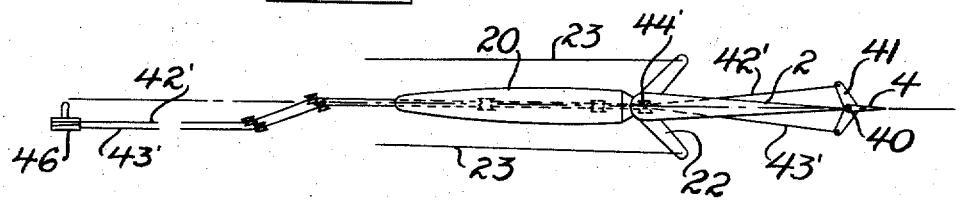
Figures 5, 6 and 7 are views corresponding to Figures 2, 3 and 4, respectively, showing an alternative form of my invention operating as a control flap solely.
Figure 7:
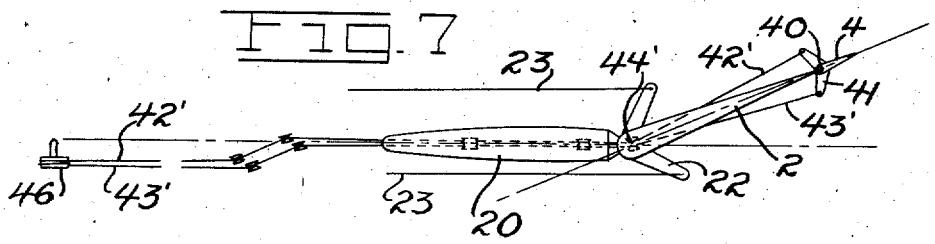
Figure 5:
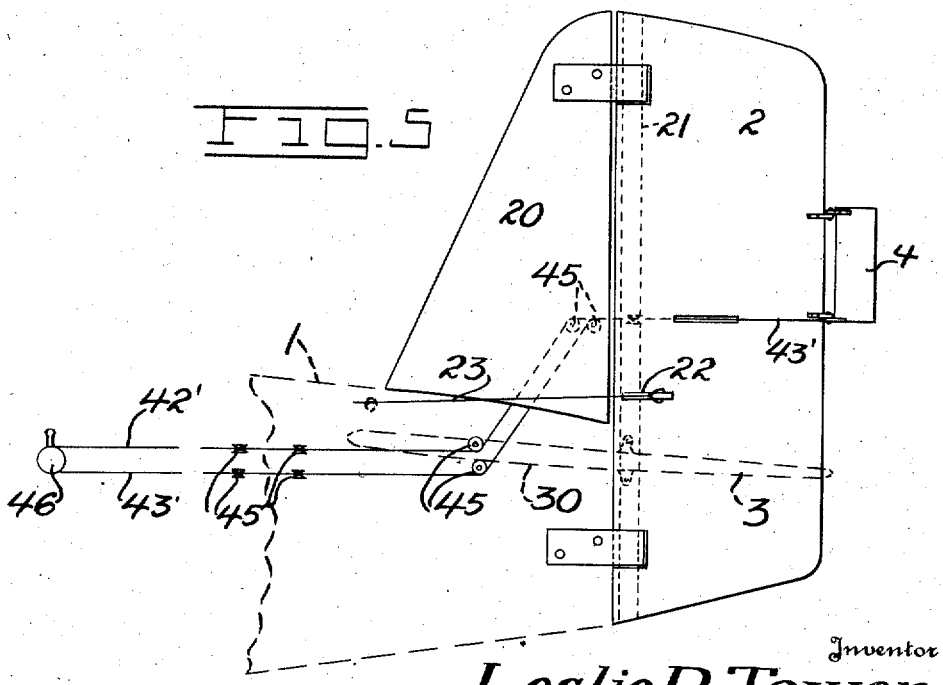

In certain planes, for instance, small sport or military planes, it may not be desirable to employ such a flap as a normal balance, yet it may be desirable to have it available for use in case of an unbalanced application of power, or to assist in overcoming large hinge moments opposing movement of a control surface, and such an arrangement is diagrammatically illustrated in Figures 5, 6 and 7. The flap 4 is in all respects similar to that described. It may have the masts 41 and be pivotally mounted along the vertical axis 40 at the trailing edge of the rudder 2, for instance. Operating means, typified by the cables 42' and 43', extend forwardly, but in this instance extend through a fair-leader 44', which lies in the pivot axis 21 of the rudder 2. Thence these cables extend forwardly as before over fair-leaders and pulleys 45 to the windlass 46. In this arrangement, because the flap operating means 42' and 43' extend through the pivot axis of the rudder, the flap 4 swings with the rudder and maintains unchanged its angle with relation thereto, except as it is changed by manipulation of the windlass 46. Upon moving the windlass, however, the angle of the control flap, relative to the plane of the rudder and the line of flight, is varied, and the flap functions as previously described to counterbalance an unbalanced force.

In the first form, by reason of the relationship of the flap controls to the hinge axis of the control surface, the flap is maintained substantially parallel to the fixed surface whereon the control surface is hinged, except as the flap is moved by its own controls. When so moved by its own controls, it still maintains substantially the same angular relation to the fixed surface for each position of the control surface. In the second form, again by reason of the relationship of the flap controls to the hinge axis of the control surface, the flap will maintain its angular relationship, for any given setting of the flap, to the movable control surface rather than to the cooperating fixed surface. The choice depends upon the relationship selected of the flap-operating means to the hinge axis of the control surface, whether through that axis or spaced at a distance therefrom.

What I claim as my invention is:

1. In combination with an airplane structure, a control surface hingedly mounted thereon, a balance flap hingedly mounted substantially at the trailing edge of said control surfaces, masts projecting oppositely from said flap, a line extending from each mast forward, guides for said lines fixed relative to the airplane structure, and disposed adjacent the hinge axis of the control surface, at a distance therefrom at each side equal to the distance of the masts from the hinge axis of the flap, and means for taking in or paying out said lines to adjust the flap angularly relative to the control surface.

2. In combination with an aircraft structure, a control surface hingedly mounted thereon, control means operable by the pilot for swinging the same, a balance flap hingedly supported on the rear portion of said control surface, control means independent of said first control means to actuate said balance flap, and a continuous two part cable disposed at opposite sides of the control surface, and secured only to and between said balance flap and said second control means, and guide means rigidly mounted on said aircraft structure disposed on each side of the control surface hinge axis, to receive the cable and to maintain the two parts thereof in spaced parallel relation between said guide means and said balance flap.

3. In combination with an aircraft structure, an adjustable control surface mounted thereon, a flap mounted on said control surface, adjusting means to vary the angle of said flap relative to the plane of the control surface from a distance, and means cooperating with said adjusting means to maintain the flap for any one selected position of the adjusting means, substantially at a constant angle relative to the aircraft structure for all adjusted positions of the control surface.

4. In combination with the fuselage of an airplane, a tail surface non-adjustably mounted on the fuselage, a hingedly mounted tail surface swingable relative to said non-adjustable surface, means so to swing said hingedly mounted tail surface at will, a flap mounted on and swingable relative to the hingedly mounted tail surface, means independent of the first means to dispose the flap in a plurality of angularly adjusted positions relative to said non-adjustable tail surface, and means independent of said second means to maintain the flap substantially in any selected adjusted position, for all angular positions of the adjustable tail surface, relative to said non-adjustable tail surface.

5. In combination with cooperating surfaces of an airplane including a fixed surface and a surface hingedly mounted upon the fixed surface, means to control swinging of the hingedly mounted surface, a flap hingedly mounted upon the hingedly mounted surface to assume various positions angularly relative to the latter, means separate from aforesaid controls and operable by the pilot during flight so to swing the flap, said flap controls including a member which bears a definite position relationship to the hinge axis of the hingedly mounted surface, thereby to maintain the flap substantially in a predetermined angular relationship to one of the cooperating surfaces for each position of the hingedly mounted surface, said flap control member extending from the fixed surface to one side of but spaced from the hinge axis of the hingedly mounted surface, and being secured to the flap at a point similarly spaced outwardly from the hinge axis of the flap, to maintain the flap, except as the flap control is operated, substantially in a predetermined angular relationship to the fixed surface, for each position of the hingedly mounted surface.

LESLIE R. TOWER.